United States Patent
Mahalank et al.

(10) Patent No.: US 10,149,143 B2
(45) Date of Patent: Dec. 4, 2018

(54) METHODS, SYSTEMS, AND COMPUTER READABLE MEDIA FOR REALM-BASED ROUTING OF DIAMETER REQUEST MESSAGES

(71) Applicant: Oracle International Corporation, Redwood Shores, CA (US)

(72) Inventors: Shashikiran Bhalachandra Mahalank, Bangalore (IN); Nitin Gupta, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 247 days.

(21) Appl. No.: 15/251,835

(22) Filed: Aug. 30, 2016

(65) Prior Publication Data

US 2018/0062977 A1    Mar. 1, 2018

(51) Int. Cl.
*G06F 15/173* (2006.01)
*H04W 8/18* (2009.01)
*H04L 12/707* (2013.01)

(52) U.S. Cl.
CPC .............. *H04W 8/18* (2013.01); *H04L 45/24* (2013.01)

(58) Field of Classification Search
USPC ................. 709/204, 223, 238; 370/393, 401
See application file for complete search history.

(56) References Cited

U.S. PATENT DOCUMENTS

| | | |
|---|---|---|
| 4,532,625 A | 7/1985 | Stover |
| 8,402,132 B2 | 3/2013 | Kang et al. |
| 8,468,267 B2 | 6/2013 | Yigang et al. |
| 8,566,474 B2 | 10/2013 | Kanode et al. |
| 8,601,073 B2 | 12/2013 | Craig et al. |

(Continued)

FOREIGN PATENT DOCUMENTS

| | | |
|---|---|---|
| CN | 104335539 B | 7/2017 |
| CN | ZL 201380027543.6 | 7/2017 |

(Continued)

OTHER PUBLICATIONS

Fajardo et al., "Diameter Base Protocol," RFC 6733, pp. 1-152 (Oct. 2012).

(Continued)

*Primary Examiner* — Quang N Nguyen
(74) *Attorney, Agent, or Firm* — Jenkins, Wilson, Taylor & Hunt, P.A.

(57) ABSTRACT

The subject matter described herein includes methods, systems, and computer-readable media for realm-based routing of Diameter request messages. One method includes maintaining device watchdog peg counters for Diameter peers. The method further includes receiving a Diameter request message for which realm-based routing is indicated. The method further includes using at least a destination realm to identify a plurality of candidate Diameter peers to which the Diameter request message could be routed. The method further includes sampling the device watchdog peg counters for the candidate Diameter peers. The method further includes selecting at least one of the candidate Diameter peers to which the message could be routed using the device watchdog peg counters. The method further includes routing the Diameter request message to one of the candidate Diameter peers based on results of the selecting.

17 Claims, 4 Drawing Sheets

(56) References Cited

U.S. PATENT DOCUMENTS

| | | | |
|---|---|---|---|
| 8,613,073 | B2 | 12/2013 | McCann et al. |
| 8,879,431 | B2 | 11/2014 | Ridel et al. |
| 9,088,478 | B2 | 7/2015 | Craig et al. |
| 9,699,045 | B2 | 7/2017 | Roach et al. |
| 9,935,922 | B2* | 4/2018 | Nas ............... H04L 63/0227 |
| 10,103,955 | B2 | 10/2018 | Renzullo et al. |
| 2003/0200277 | A1 | 10/2003 | Kim |
| 2005/0232407 | A1 | 10/2005 | Craig et al. |
| 2008/0250156 | A1 | 10/2008 | Agarwal et al. |
| 2009/0083861 | A1 | 3/2009 | Jones |
| 2009/0265467 | A1 | 10/2009 | Peles |
| 2010/0299451 | A1 | 11/2010 | Yigang et al. |
| 2011/0040845 | A1 | 2/2011 | Cai et al. |
| 2011/0061061 | A1 | 3/2011 | Chen et al. |
| 2011/0199906 | A1 | 8/2011 | Kanode et al. |
| 2011/0200053 | A1* | 8/2011 | Kanode ............ H04L 63/0892 370/401 |
| 2011/0202676 | A1* | 8/2011 | Craig ............... H04L 45/306 709/238 |
| 2012/0036246 | A1 | 2/2012 | Marsico |
| 2013/0198353 | A1* | 8/2013 | Hua ................. H04L 69/40 709/223 |
| 2013/0329740 | A1* | 12/2013 | Wallace ............ H04L 45/302 370/393 |
| 2015/0058414 | A1* | 2/2015 | Mann ............... H04L 65/403 709/204 |
| 2015/0271708 | A1 | 9/2015 | Zaus et al. |
| 2016/0359902 | A1* | 12/2016 | Petrilak ............ H04Q 3/0091 |
| 2017/0099202 | A1* | 4/2017 | Renzullo ............ H04L 43/06 |
| 2017/0126522 | A1* | 5/2017 | McCann ............ H04L 67/28 |
| 2017/0318570 | A1* | 11/2017 | Shaw ................ H04L 5/0053 |

FOREIGN PATENT DOCUMENTS

| | | |
|---|---|---|
| EP | 2 280 520 A1 | 2/2011 |
| EP | 2 466 832 A1 | 6/2012 |
| JP | 2011/166737 A | 8/2011 |
| JP | 6059336 | 1/2017 |
| KR | 10-2009-0029348 | 3/2009 |
| WO | WO 2009/070179 A1 | 6/2009 |
| WO | WO 2012/119147 A1 | 9/2012 |
| WO | WO 2013/155535 A1 | 10/2013 |

OTHER PUBLICATIONS

Aboba et al., "Authentication, Authorization and Accounting (AAA) Transport Profile," RFC 3539, pp. 1-41 (Jun. 2003).

Final Office Action for U.S. Appl. No. 14/873,112 (dated Jan. 24, 2018).

Non-Final Office Action for U.S. Appl. No. 14/873,112 (dated Jul. 14, 2017).

Letter Regarding Decision to Grant Chinese Patent Application No. ZL201380027543.6 (dated May 3, 2017).

Notice of Allowance and Fee(s) Due for U.S. Appl. No. 13/863,351 (dated Apr. 20, 2017).

Letter regarding notice of grant for Japanese Patent Application No. 2015/505985 (dated Nov. 29, 2016).

Applicant-Initiated Interview Summary for U.S. Appl. No. 13/863,351 (dated Nov. 9, 2016)

Notification of the First Office Action for Chinese Patent Application No. 2013800275436 (dated Sep. 6, 2016)

Letter regarding Office Action for Japanese Patent Application No. 2015-505985 (dated Sep. 6, 2016)

Final Office Action for U.S. Appl. No. 13/863,351 (dated Aug. 26, 2016).

Applicant-Initiated Interview Summary for U.S. Appl. No. 13/863,351 (dated May 27, 2016).

Non-Final Office Action for U.S. Appl. No. 13/863,351 (dated Mar. 17, 2016).

Extended European Search Report for European Application No. 13776083.1 (dated Dec. 14, 2015).

Advisory Action for U.S. Appl. No. 13/863,351 (dated Nov. 25, 2015).

Final Office Action for U.S. Appl. No. 13/863,351 (dated Sep. 11, 2015).

Non-Final Office Action for U.S. Appl. No. 13/863,351 (dated Mar. 27, 2015).

Communication of European publication number and information on the application of Article 67(3) EPC for European Application No. 13776083.1 (dated Jan. 21, 2015).

Notification of Transmittal of the International Search Report and the Written Opinion of the International Searching Authority, or the Declaration for International Application No. PCT/US2013/036664 (dated Jul. 2, 2013).

Calhoun et al., "Diameter Base Protocol," RFC 3588, pp. 1-147 (Sep. 2003).

Advisory Action and Examiner Initiated Interview Summary for U.S. Appl. No. 14/873,112 (dated Apr. 20, 2018).

Notice of Allowance and Fee(s) Due for U.S. Appl. No. 14/873,112 (dated May 31, 2018).

* cited by examiner

METHODS, SYSTEMS, AND COMPUTER READABLE MEDIA FOR REALM-BASED ROUTING OF DIAMETER REQUEST MESSAGES

TECHNICAL FIELD

The subject matter described herein relates to routing of Diameter request messages. More particularly, the subject matter described herein relates to realm-based routing of Diameter request messages.

BACKGROUND

When Diameter nodes, such as Diameter agents and Diameter clients, need to route a Diameter request message to a next hop peer and the request message does not contain a destination host attribute value pair (AVP) or the host name in the destination host AVP is not directly connected to the Diameter node, Diameter realm-based routing is used to route the request to the next hop Diameter peer. Diameter nodes use the application ID and the destination realm AVP values to determine the next hop Diameter peer. If there are multiple peers serving the same realm, i.e., if there are multiple Diameter connections available for routing the Diameter requests, then the Diameter node needs to distribute the requests across all available Diameter peer connections.

One possible implementation for distributing Diameter requests across available peers include using a static pre-configured percentage of traffic distribution across peers, such as a round-robin algorithm. However, percentage-based distribution requires Diameter nodes to keep track of the number of messages sent to each peer per application ID. In addition, percentage-based distribution does not account for the actual load on each of the Diameter peers.

Accordingly, there exists a need for improved methods, systems, and computer readable media for realm-based routing of Diameter request messages.

SUMMARY

The subject matter described herein includes methods, systems, and computer-readable media for realm-based routing of Diameter request messages. One method includes maintaining device watchdog peg counters for Diameter peers. The method further includes receiving a Diameter request message for which realm-based routing is indicated. The method further includes using at least a destination realm to identify a plurality of candidate Diameter peers to which the Diameter request message could be routed. The method further includes sampling the device watchdog peg counters for the candidate Diameter peers. The method further includes selecting at least one of the candidate Diameter peers to which the message could be routed using the device watchdog peg counters. The method further includes routing the Diameter request message to one of the candidate Diameter peers based on results of the selecting.

According to another aspect of the subject matter described herein, maintaining device watchdog peg counters for the Diameter peers includes maintaining, for each of the Diameter peers, a device watchdog connection reset peg counter indicating a number of times that a connection with the Diameter peer has been reset due to expiration of a device watchdog timer.

According to another aspect of the subject matter described herein, maintaining device watchdog peg counters for the candidate Diameter peers includes maintaining, for each of the Diameter peers, a device watchdog message peg counter that counts a number of successful device watchdog message exchanges with the Diameter peer.

According to another aspect of the subject matter described herein, maintaining device watchdog peg counters for the Diameter peers includes maintaining, for each of the Diameter peers, a device watchdog timer reset peg counter that counts a number of times a device watchdog timer has been reset for the Diameter peer.

According to another aspect of the subject matter described herein, selecting at least one of the candidate Diameter peers to which the Diameter request message could be routed using Device watchdog peg counters includes selecting a first subset of the candidate Diameter peers based on relative values of device watchdog connection reset peg counters maintained for the candidate Diameter peers.

According to another aspect of the subject matter described herein, selecting the first subset of the candidate Diameter peers comprises including, in the first subset, candidate Diameter peers with a lowest value of the device watchdog connection reset peg counter and excluding from the first subset, candidate Diameter peers with values of the device watchdog connection reset peg counter higher than the lowest value.

According to another aspect of the subject matter described herein, selecting at least one of the candidate Diameter peers includes selecting, from the first subset, a second subset of the candidate Diameter peers based on relative values of the device watchdog message peg counters maintained for the connections.

According to another aspect of the subject matter described herein, selecting the second subset comprises including, in the second subset, candidate Diameter peers with a highest value of the device watchdog message peg counter and excluding, from the second subset, candidate Diameter peers with values of the device watchdog message peg counter lower than the highest value of the device watchdog message peg counter.

According to another aspect of the subject matter described herein, selecting at least one of the candidate Diameter peers includes selecting, from the second subset, a third subset of candidate Diameter peers based on relative values of a device watchdog timer reset peg counter maintained for the candidate Diameter peers.

According to another aspect of the subject matter described herein, selecting the third subset comprises including, in the third subset, candidate Diameter peers with a lowest value of the device watchdog timer reset peg counter and excluding from the third subset, candidate Diameter peers with values of the device watchdog timer reset peg counter higher than the lowest value of the device watchdog timer reset peg counter.

According to another aspect of the subject matter described herein, a system for realm-based routing of Diameter request messages is provided. The system comprises a Diameter node including at least one processor and a memory for receiving a Diameter request message for which realm-based routing is indicated. The Diameter node includes a device watchdog peg counter-based peer selector for maintaining a plurality of device watchdog peg counters for Diameter peers, using at least a destination realm to identify a plurality of candidate Diameter peers to which the Diameter request message could be routed, sampling the device watchdog peg counters for the candidate Diameter peers, selecting at least one of the candidate Diameter peers to which the message could be routed using the device watchdog peg counters. The Diameter node further includes a routing engine for routing the Diameter request message to one of the candidate Diameter peers based on results of the selecting.

According to another aspect of the subject matter described herein, the device watchdog peg counter-based peer selector is configured to maintain, for each of the Diameter peers, a device watchdog connection reset peg counter indicating a number of times that a connection with a Diameter peer has been reset due to expiration of a device watchdog timer.

According to another aspect of the subject matter described herein, the device watchdog peg counter-based peer selector is configured to maintain, for each of the Diameter peers, a device watchdog message peg counter that counts a number of successful watchdog message exchanges with a Diameter peer.

According to another aspect of the subject matter described herein, the device watchdog peg counter-based peer selector is configured to maintain, for each of the Diameter peers, a device watchdog timer reset peg counter that counts a number of times a device watchdog timer has been reset for the Diameter peer.

According to another aspect of the subject matter described herein, the device watchdog peg counter-based peer selector is configured to select a first subset of the candidate Diameter peers based on relative values of device watchdog connection reset peg counters maintained for the candidate Diameter peers.

According to another aspect of the subject matter described herein, the device watchdog peg counter-based peer selector is configured to include, in the first subset, candidate Diameter peers with a lowest value of the device watchdog connection reset peg counter and exclude, from the first subset, candidate Diameter peers with values of the device watchdog connection reset peg counter higher than the lowest value.

According to another aspect of the subject matter described herein, the device watchdog peg counter-based peer selector is configured to select, from the first subset, a second subset of the candidate Diameter peers based on relative values of the device watchdog message peg counters maintained for the connections.

According to another aspect of the subject matter described herein, the device watchdog peg counter-based peer selector is configured to include, in the second subset, candidate Diameter peers with a highest value of the device watchdog message peg counter and exclude from the second subset, candidate Diameter peers with values of the device watchdog message peg counter lower than the highest value of the device watchdog message peg counter.

According to another aspect of the subject matter described herein, the watchdog peg counter-based peer selector is configured to select, from the second subset, a third subset of candidate Diameter peers based on relative values of a device watchdog timer reset peg counter maintained for the candidate Diameter peers.

According to another aspect of the subject matter described herein, the device watchdog peg counter-based peer selector is configured to include, in the third subset, candidate Diameter peers with a lowest value of the device watchdog timer reset peg counter and exclude, from the third subset, candidate Diameter peers with values of the device watchdog timer reset peg counter higher than the lowest value of the device watchdog timer reset peg counter.

The subject matter described herein may be implemented in software in combination with hardware and/or firmware. For example, the subject matter described herein may be implemented in software executed by a processor. In some implementations, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a non-transitory computer readable medium that implements the subject matter described herein may be located on a single device or computing platform or may be distributed across multiple devices or computing platforms.

As used herein, the term "node" refers to at least one physical computing platform including one or more processors and memory. For example, a node may include a virtual machine and/or software executing on a physical computing platform.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
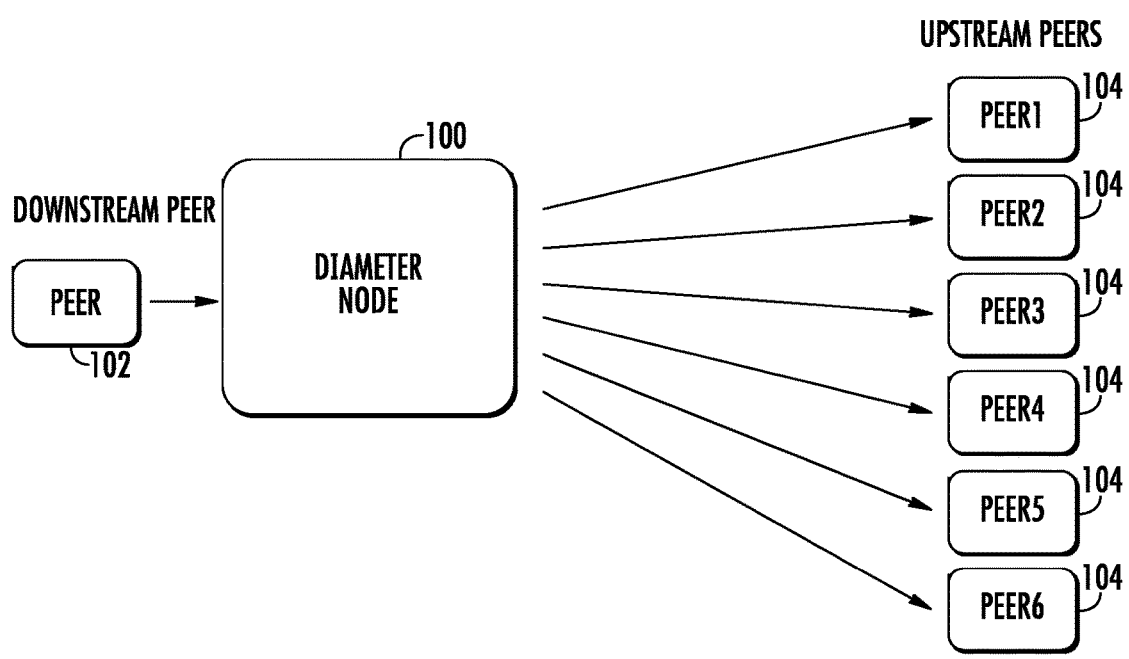
FIG. 1 is a network diagram illustrating a Diameter node performing realm-based routing of Diameter request messages from a downstream peer to plural upstream peers according to an embodiment of the subject matter described herein.

The subject matter described herein utilizes device watchdog state machine statistics for selecting Diameter peers when performing realm-based routing of Diameter requests. Device watchdog Diameter messages are used to detect transport failure and for connection failover procedures as specified in IETF RFC 6733, Diameter Base Protocol, and IETF RFC 3539 Authentication, Authorization, and Accounting (AAA) Transport Profile, the disclosures of which are incorporated herein by reference in their entireties. RFC 3539 describes the use of the device watchdog state machine to detect transport failures. Device watchdog messages are exchanged between Diameter peers if the peers do not exchange any Diameter application messages after a preconfigured device watchdog time interval that is tracked by a device watchdog timer. Device watchdog requests are sent to a Diameter peer upon expiration of the device watchdog timer. The device watchdog timer is reset when a device watchdog request is transmitted. If a device watchdog answer is not received from the Diameter peer before the device watchdog timer expires, then the transport connection to the peer is closed. However, if there is any exchange of Diameter application messages before the device watchdog timer expires, the device watchdog timer is stopped and restarted with no exchange of device watchdog messages.

IETF RFC 3539 specifies an application layer watchdog procedure which IETF 6733 indicates that Diameters peers must support. According to the application layer watchdog procedure specified in RFC 3539, AAA protocols (such as Diameter) must support an application layer watchdog message to more quickly detect and transport an application layer failure. The application layer watchdog message enables failover from a peer that has failed, either because the peer is unreachable or because the peer's application functions have failed. The application layer watchdog message is used to enable an AAA client or agent to detect a failure and determine when to resend communications to a peer or Diameter node on another connection. The application layer watchdog is designed to detect failures of an immediate peer rather than downstream peers.

According to the watchdog algorithm specified in RFC 3539, watchdog behavior is controlled by a single timer (TW). When any AAA message is received, TW is reset. TW has a defined expiration period, which in IETF 3539 is suggested to be between 6 and 30 seconds. However, the subject matter described herein is not limited to any particular value of the watchdog timer. The subject matter described herein may operate on any value of the watchdog timer used by the underlying failover algorithm.

If TW expires and no watchdog response is pending, then a watchdog request message is sent. On sending a watchdog request, TW is reset. If the watchdog timer expires and a watchdog response is pending, then a failover is implemented. Failover includes sending all messages in a pending message queue for the failed connection to an alternate agent.

IETF RFC 6733 defines the format for device watchdog request and device watchdog answer messages used by the Diameter protocol. As indicated above, IETF RFC 6733 indicates that the Diameter protocol use the transport failure algorithm defined in RFC 3539.

Thus, IETF RFC 3539 and 6733 specify a device watchdog procedure that maintains a device watchdog timer and exchanges device watchdog request and answer messages in order to initiate failover. Other than the device watchdog timer and state information required to implement the device watchdog state machine, IETF 6733 and IETF 3539 do not require any additional parameters to implement the failover procedure. In addition, the device watchdog time only specified as being used for failover and is not used to select routing candidates for ream based routing.

A Diameter node as described herein maintains three new statistics, which are referred to herein as device watchdog peg counters, for adjacent Diameter peers, and uses these peg counters to select among candidate Diameter peers when performing realm-based routing. The three peg counters defined herein include a device watchdog connection reset peg counter, a device watchdog message peg counter, and a device watchdog timer reset peg counter are maintained for each Diameter peer connection. Values of the counters are used to select subsets of the peers for realm-based routing. The counter values are reset after each configured sampling interval. Each of the peg counters will now be described.

1. Device Watchdog Connection Reset Peg Counter: This counter keeps track of number of times the peer connection is dropped due to a device watchdog (DWD) timeout. If a device watchdog answer (DWA) message is not received for an outbound device watchdog request (DWR) in specified DWD timeout interval then connection is closed. A higher value of the device watchdog connection reset peg counter indicates that the peer is overloaded and unresponsive.

2. Device Watchdog Message Peg Counter: A DWD request message is sent to a Diameter peer if there is no traffic on the peer connection for configured DWD time interval. This counter keeps track of number of DWD request messages sent to an adjacent peer and corresponding DWA messages received from peer for a configured time interval. The device watchdog message peg counter is incremented for each successful exchange of outbound DWR and inbound DWA message. A higher value of the device watchdog message peg counter represents a lower amount of non-watchdog Diameter application traffic towards a peer and thus that the peer is likely be available to process non-watchdog Diameter application traffic.

3. Device Watchdog (DWD) Timer Reset Peg Counter: The DWD timer reset peg counter counts, for each peer connection, the number of times the DWD timer has been reset for predefined time interval. The DWD timer is reset to value 0 and restarted for every exchange of messages on the Diameter transport connection. The number of resets provides an indication of the frequency of message flow on the connection and can be used for selecting the connection for realm-based routing. This reset counter keeps track of number of times that DWD timer has been reset in a predefined last time interval. A higher value of the device watchdog timer reset peg counter represents more the traffic flow towards a peer and thus that the peer is less likely to be available to process Diameter application traffic.

FIG. 1 is a network diagram illustrating an exemplary operating environment in which the above-referenced device watchdog peg counters may be used to select among Diameter peers when performing realm-based routing. Referring to FIG. 1, a Diameter node 100 may receive Diameter request messages from a downstream Diameter peer 102. The Diameter request messages may be directed to a realm that corresponds to any of upstream peers 104. For example, the Diameter request messages may lack a destination host identifier and thus Diameter node 100 must select from among upstream peers 104 which peer to route the received Diameter request messages.

Figure 2:
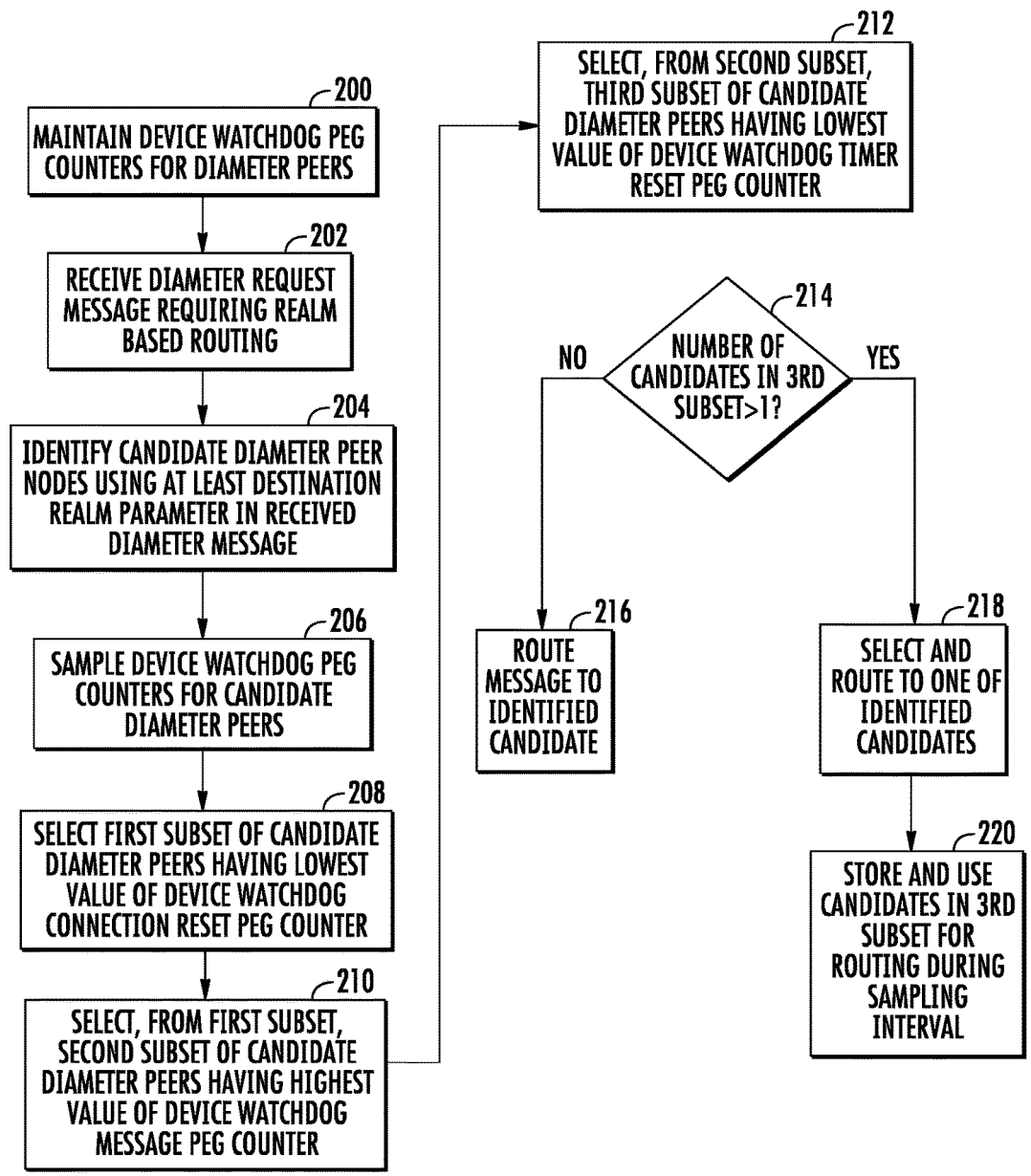
FIG. 2 is a flow chart illustrating an exemplary process for realm-based routing of Diameter request messages using device watchdog peg counters according to an embodiment of the subject matter described herein.

FIG. 2 is a flow chart illustrating an exemplary process that may be implemented by Diameter node 100 in selecting one or more of peers 104 to route a received Diameter request message that requires realm-based routing. Referring to FIG. 2, in step 200 device watchdog peg counters are maintained for Diameter peers. For example, Diameter node 100 may maintain one or more of the device watchdog connection reset peg counter, the watchdog message peg counter, and the device watchdog timer reset peg counter for each Diameter peer of which Diameter node 100 has knowledge (e.g., through static configuration or Diameter capabilities exchange). In this example, it is assumed that Diameter node 100 maintains each of the above-described device watchdog peg counters for each of Diameter peers 104 and also for Diameter peer 102. Maintaining the peg counters includes incrementing the peg counters each time an event occurs that requires a peg counter to be incremented or reset. For example each time a Diameter connection is reset due to expiration of the device watchdog timer when a Device watchdog request is pending, the device watchdog connection reset peg counter for a connection may be incremented.

A sampling/maintenance time interval may be defined such that the count stored for each peg counter is representative of the current state of a Diameter peer. For example, at the beginning of the sampling/maintenance time interval, each of the device watchdog peg counters may be set to zero. During the sampling/maintenance time interval, the device watchdog peg counters may be adjusted based on device watchdog events. During the sampling/maintenance time interval, the device watchdog peg counters for Diameter peers identified as routing candidates will be sampled and used to make a routing decision. At the beginning of the next device watchdog sampling/maintenance time interval, the device watchdog peg counters may be reset to zero. The length of the sampling/maintenance time interval may be set based on the desired granularity of the device watchdog peg counter information and the amount of processing required to periodically sample the device watchdog peg counters.

In step 202, a Diameter request message requiring realm-based routing is received. For example, the Diameter request message may be received by Diameter node 100 illustrated in FIG. 1. The Diameter request message may be any Diameter request message for which realm-based routing is indicated. For example, the Diameter request message may include a destination realm AVP but no destination host AVP. In another example, the Diameter request message may include a destination host AVP, but the destination host may not be directly connected the Diameter node that received the Diameter request message, requiring the receiving Diameter node to select among multiple adjacent peer nodes as the next hop for the received Diameter request message. For example, the Diameter request message may require realm-based routing by Diameter node 100 to any of peers 104 illustrated in FIG. 1.

In step 204, candidate Diameter peer nodes are identified based on at least a destination realm AVP parameter in the received Diameter message. The destination realm AVP identifies the realm to which a message should be routed. The receiving Diameter node may have connections with multiple Diameter servers in the destination realm capable of processing or routing the Diameter request message. These capable Diameter peers are referred to herein as candidate Diameter peers because the Diameter peers are candidates for processing the received Diameter request message. In FIG. 1, the set of candidate Diameter peers may be any of upstream peers 104.

Step 204 may utilize, in addition to the destination realm, an application identifier to select the candidate Diameter peers. The application identifier is present in the Diameter request message header and identifies the application type to which the Diameter request message should be directed. For example, the application id may indicate that the message should be directed to a home subscriber server (HSS), a policy and charging rules function (PCRF), an application function (AF), etc. Only Diameter peers that provide the service corresponding to the application id in the received Diameter request message may be selected as candidate Diameter peers.

According to RFC 6733, each Diameter application must have an IANA-assigned application id. The base Diameter protocol does not require an application Id since support of the base Diameter protocol is mandatory for Diameter nodes. During the capabilities exchange, Diameter nodes inform their peers of locally supported applications. In FIG. 1, Diameter peers 104 may inform Diameter node 100 of the applications supported by Diameter peers 104. Diameter node 100 may store this information and use the information to select the candidate Diameter peers for realm-based routing of a received Diameter request message.

In step 206, one or more of the device watchdog connection reset peg counter, the device watchdog message peg counter, and the device watchdog timer reset peg counter are sampled for each of the candidate Diameter peers. Step 206 may be performed by Diameter node 100 during the sampling/maintenance time interval described above. In this example, the values of all three of the device watchdog peg counters are sampled for each of the candidate Diameter peers.

In step 208, a first subset of the candidate Diameter peers is selected with the lowest value of the device watchdog connection reset peg counter. As stated above, the device watchdog connection reset peg counter indicates the number of times that a connection times out based on failure to respond to a Device watchdog request message. A connection that times out frequently indicates an unresponsive peer. Accordingly, it may be desirable to exclude from the set of potential routing candidates peers whose device watchdog connection reset peg counters have higher relative values than other peers. The peers with the lowest value of the device watchdog connection reset peg counter are included in the first subset, and peers with higher values are excluded from the first subset. Step 208 may be performed by Diameter node 100 to determine which of peers 104 to include in the first subset.

In step 210, the process includes selecting, from the first subset, a second subset of candidate Diameter peers with the highest value of the device watchdog message peg counter. As described above, the device watchdog message peg counter indicates the number of successful device watchdog message exchanges between Diameter peers. Device watchdog messages are only sent when Diameter peers are not exchanging Diameter application traffic. Accordingly, higher values of the device watchdog message peg counter indicate that the Diameter nodes are not exchanging Diameter application traffic. Because such peers are likely to be less loaded than other peers, peers with the highest value of the device watchdog message peg counter are included in the second subset, and peers with lower relative values of the device watchdog message peg counter are excluded from the second subset. Step 210 may be performed by Diameter node 100 to determine which of peers 104 that were included in the first subset should be included in the second subset.

In step 212, the process includes selecting, from the second subset, a third subset of candidate Diameter peers with the lowest value of the device watchdog timer reset peg counter. As described above, any traffic being sent, including application traffic and device watchdog traffic, resets the device watchdog timer reset peg counter. Accordingly, candidate Diameter peers with lower values of the device watchdog timer reset peg counter have less traffic and are likely to be less busy than peers with higher values of the device watchdog timer reset peg counter. The candidate Diameter peers with the lowest value of the device watchdog timer reset peg counter are included in the third subset, and candidate Diameter peers with higher values of the device watchdog timer reset peg counter are excluded from the third subset. Step 212 may be performed by Diameter node 100 to determine which of peers 104 that were included in the second subset should be included in the third subset.

In step 214, it is determined whether the number of candidate Diameter peers in the third subset is greater than one. If only a single candidate Diameter peer is included in the third subset, control proceeds to step 216 where the Diameter message is routed to the selected peer. Steps 214 and 216 may be performed by Diameter node 100 to route a received message to the single remaining candidate Diameter peer.

If more than one candidate Diameter peer is included in the third subset, control proceeds from step 214 to step 218, where one of the candidate Diameter peers in the third subset is selected, and the message is routed to that peer. In step 220, the candidate Diameter peers in the third subset are stored used for the routing of future messages with the same destination realm and application identifier as the received Diameter message that are received within the same sampling/maintenance interval as the received Diameter message. For example, during the sampling interval, if the third subset includes three peers, Diameter node 100 may alternatingly select among the three peers to route received Diameter messages addressed to the same application and realm using round robin selection or other suitable selection algorithm.

Figure 3:
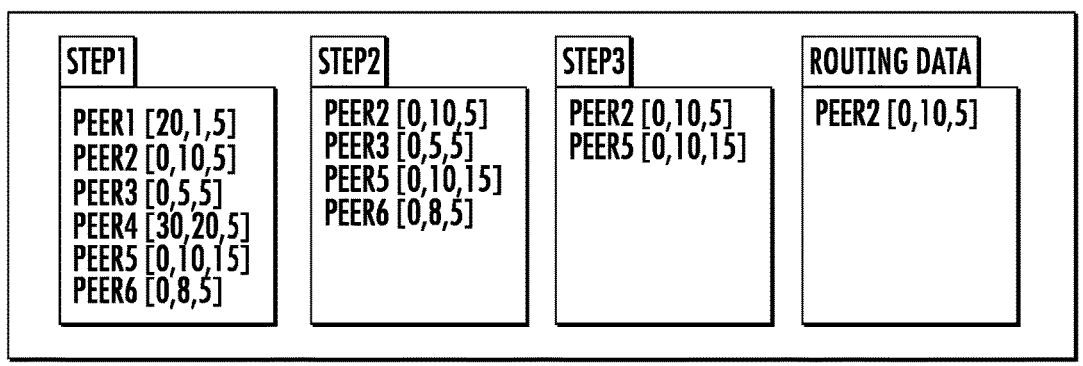
FIG. 3 is a diagram illustrating exemplary selection of peers for realm-based routing using device watchdog peg counters where the result of the selection is a single peer.

FIG. 3 illustrates an example of Diameter peer selection using device watchdog peg counters where the result of the selection is a single candidate Diameter peer. Referring to FIG. 3, the numbers in brackets after each peer identifier indicate the values of the device watchdog connection reset peg counter, the device watchdog message peg counter, and the device watchdog timer reset peg counter, respectively. For example, numbers in brackets following the peer identifier Peer1 are [20, 1, 5]. 20 represents the value of the device watchdog connection reset peg counter, 1 represents the value of the device watchdog message peg counter, and 5 represents the value of the device watchdog timer reset peg counter.

The peers listed in the boxes labeled Step1, Step2, and Step3 are the Diameter peers that are potential routing candidates before selection of the peers to be included in the first, second and third subsets described with respect to steps 208, 210, and 212 illustrated in FIG. 2. The box labeled Routing Data indicates the single remaining candidate Diameter peer after the three subset selection steps.

In the box labeled Step1, it is assumed that there are six candidate Diameter peers, Peer1-Peer6 selected using the application ID and destination realm parameters. Peers Peer1-Peer6 may correspond to the correspondingly-labeled upstream peers 104 illustrated in FIG. 1. Accordingly, the first step is to select the first subset of candidate Diameter peers with the lowest value of the device watchdog connection reset peg counter. The peers with the lowest value of the device watchdog connection reset peg counter are likely to be most available to process Diameter application traffic (such as the received Diameter request message) because these peers have the lowest number of resets due to unavailability timeouts. In the box labeled Step1, Peer2, Peer3, Peer5, and Peer6 all have a device watchdog connection reset peg counter value of 0. Peer1 and Peer4 have device watchdog connection reset peg counter values of 20 and 30, respectively. The lowest value of the device watchdog connection reset peg counter is 0. Accordingly, Peers 2, 3, 5, and 6 are selected to be included in the first subset, and Peers 1 and 4 are excluded from the first subset. The box labeled Step2 indicates the candidate Diameter peers remaining in the first subset after selection based on the device watchdog connection reset peg counter.

The next step is to select, from the first subset, peers with the highest value of the device watchdog message peg counter. The device watchdog message peg counter indicates the number of successful device watchdog message exchanges with each peer. The highest value of the device watchdog message peg counter indicates the least active Diameter peer from the standpoint of Diameter application messages, because device watchdog messages are only sent when there is no Diameter application traffic with a peer. In the box labeled Step2, Peers 2 and 5 each have a device watchdog message peg counter value of 10 and Peers 3 and 6 have device watchdog message peg counter values of 5 and 8, respectively. In this example, 10 is the highest value of the device watchdog message peg counter. Accordingly, Peers 2 and 5 are included in the second subset, and Peers 3 and 6 are excluded from the second subset. The box labeled Step3 indicates the candidate Diameter peers in the second subset after selection based on the device watchdog message peg counter and the device watchdog connection reset peg counter.

The next step in the process is to select, for inclusion in the third subset, candidate Diameter peers with the lowest value of the device watchdog timer reset peg counter. The lowest value of the device watchdog timer reset peg counter indicates the least active remaining peer because the lower the value of the device watchdog timer reset peg counter, the lower the message exchange with the Diameter peer. In the box labeled Step3, Peer2 has a device watchdog timer reset peg counter value of 5 and Peer5 has a device watchdog timer reset peg counter value of 15. The lowest value of the device watchdog timer reset peg counter is 5, which corresponds to Peer2. Accordingly, Peer2 is selected for inclusion in the third subset, and Peer5 is excluded from the third subset. The box labeled Routing Data indicates the results selection algorithm after applying subset selection based on the three device watchdog peg counters. In this example, only a single candidate Diameter peer remains in the third subset. Accordingly, the Peer2 is selected as the peer to which the received Diameter message should be routed, and the receiving Diameter node routes the received Diameter message to Peer2.

Figure 4:
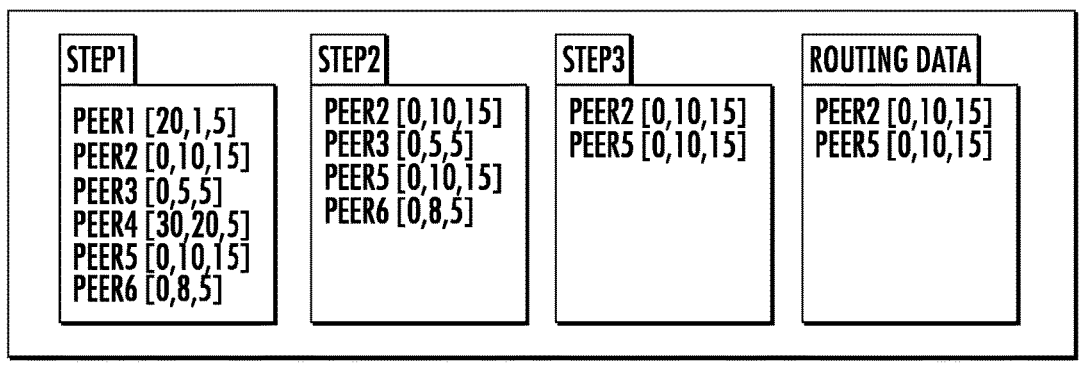
FIG. 4 is a diagram illustrating exemplary selection of peers for realm-based routing using device watchdog peg counters where the result of the selection includes multiple peers.

In some situations, based on the relative values of the peg counters among the candidate Diameter peers, the results of applying subset selection based on the device watchdog peg counters may be that multiple peers remain in the routing data. FIG. 4 illustrates such an example. Referring to FIG. 4, the box labeled Step1 indicates the candidate Diameter peers that are selected using the destination realm and application identifier in a received Diameter message. In this example, there are 6 candidate Diameter peers, Peer1-Peer6, that are selected as potential realm-based routing candidates.

The first step in the algorithm is to use the device watchdog connection reset peg counter with the lowest value to select the candidate Diameter peers that are included in the first subset. In the illustrated example, Diameter Peers 2, 3, 5, and 6 have a device watchdog connection reset peg counter value of 0, and Peers 1 and 4 have a device watchdog connection reset peg counter value of 20 and 30, respectively. Peers 2, 3, 5, and 6 have the lowest value of the device watchdog connection reset peg counter. Accordingly, candidate Diameter Peers 2, 3, 5, and 6 are included in the first subset, and Peers 1 and 4 are excluded from the first subset. The box labeled Step2 indicates the candidate Diameter peers in the first subset after selection based on the device watchdog connection reset peg counter.

The next step is to select, from the first subset, peers with the highest value of the device watchdog message peg counter. In the illustrated example, Peers 2 and 5 each have device watchdog message peg counters of 10, and Peers 3 and 6 have device watchdog message peg counters of 5, and 8, respectively. Because Peers 2 and 5 have the highest value of the device watchdog message peg counter, Peers 2 and 5 are selected for inclusion in the second subset and Peers 3 and 6 are excluded from the second subset. The box labeled Step3 indicates the candidate Diameter peers that remain in the second subset after selection based on the device watchdog connection reset peg counter and the device watchdog message peg counter.

The next step is to select, for inclusion in the third subset, candidate Diameter peers with the lowest value of the device watchdog timer reset counter. In the illustrated example, Peers 2 and 5 both have the same device watchdog timer reset peg counter value of 15. Accordingly, Peers 2 and 5 are both selected for inclusion in the third subset. The box labeled Routing Data indicates both Peers 2 and 5 being included in the routing data. One of the peers needs to be selected for routing the received Diameter request message. The peer may be selected using any suitable method, such as round-robin or other suitable selection algorithm. The candidate Diameter peers in the third subset are stored for routing of subsequent messages with the same destination realm and application identifier parameters as the received Diameter message that are received before the watchdog peg counter sampling/maintenance time interval expires. For example, if 10 Diameter request messages addressed to the same destination realm and application are received before the end of the device watchdog sampling/maintenance time interval, the 10 messages may be alternatingly routed to Peers 2 and 5. When the device watchdog sampling/maintenance time interval ends, the values of the device watchdog peg counters are reset, new values are accumulated based on watchdog events, and the subset selection process is repeated for Diameter request messages received in the next sampling/maintenance interval.

Peer selection for realm-based routing based on device watchdog peg counters may be performed by any suitable Diameter node that is configured to perform realm-based routing. Examples of such nodes include:

1. Diameter signaling router (DSR): acts as Diameter routing agent in long term evolution (LTE) and IP multimedia subsystem (IMS) networks. A DSR may also act as Diameter proxy and/or a Diameter relay agent.
2. Unified data repository (UDR): acts as subscriber profile repository (SPR) used by a policy and charging rules function (PCRF) and supports Sp based Diameter interfaces used for communication with PCRF and application servers.
3. Policy manager (PM): acts as a PCRF network element supporting Gx, Sp, Rx, Sy based Diameter interfaces for communicating with other Diameter nodes.
4. Billing and revenue manager (BRM): acts charging system supporting online and offline charging using Gy, Ro, Rf and Sy Diameter interfaces.

Thus, the steps described herein for Diameter routing peer selection using device watchdog peg counters may be implemented by a DSR, UDR, PM, BRM, or any other node that performs Diameter realm-based routing.

Figure 5:
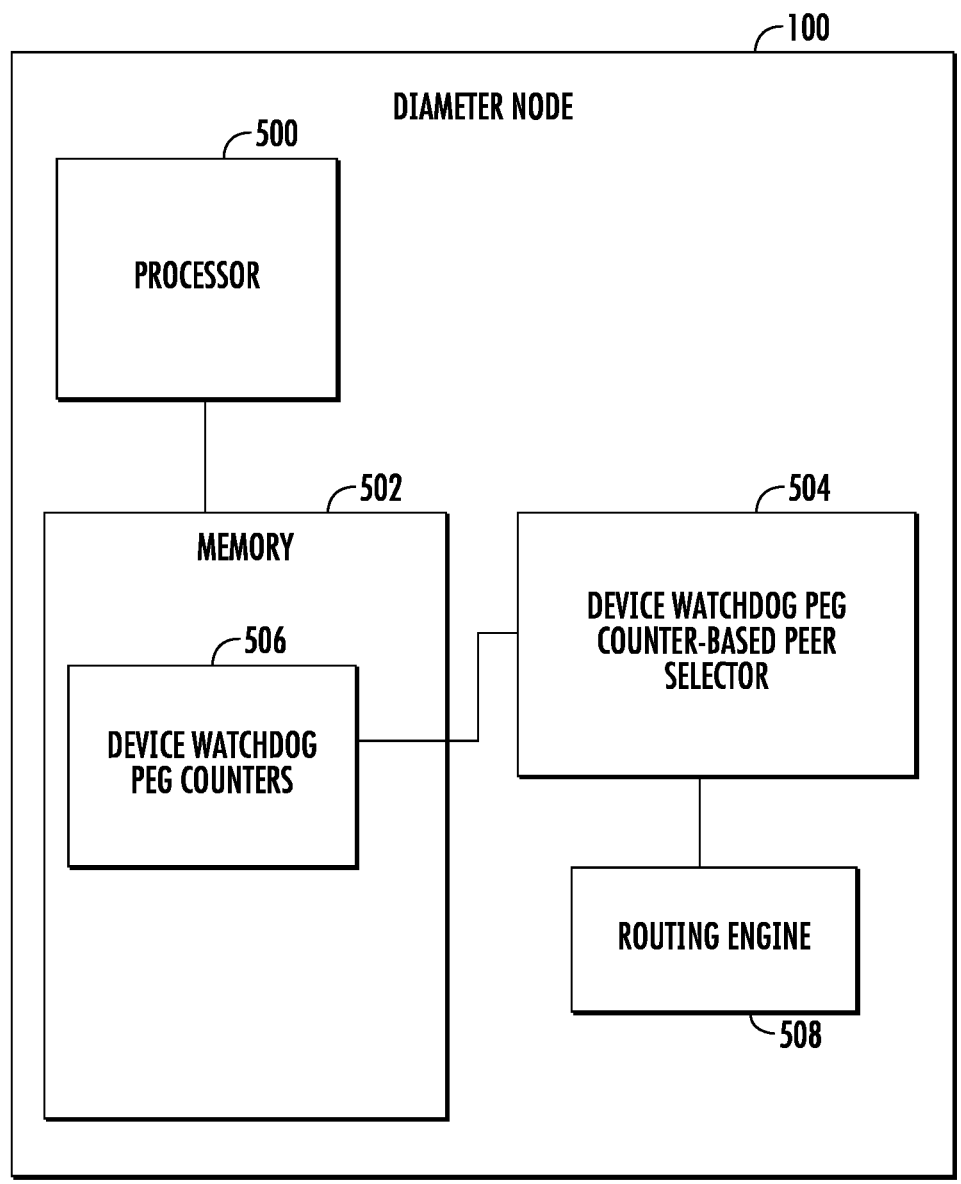
FIG. 5 is a block diagram illustrating an exemplary architecture for a Diameter node that performs realm-based routing of Diameter request messages using device watchdog peg counters according to an embodiment of the subject matter described herein.

FIG. 5 is a block diagram of an exemplary Diameter node that performs selection of Diameter peers using device watchdog peg counters according to an embodiment of the subject matter described herein. Referring to FIG. 5, Diameter node 100 includes at least one processor 500 and a memory 502. Diameter node 100 may be any of the above-referenced Diameter nodes, including a DSR, a UDR, a policy manager or a billing and revenue manager. Diameter node 100 includes a device watchdog peg counter-based peer selector 504 for implementing the steps described above with respect to FIGS. 2-4 for selecting among multiple Diameter peers using device watchdog peg counters. Device watchdog peg counter-based peer selector 504 may also maintain the device watchdog peg counters 506 in memory 502 using the procedures described above. For example, to maintain the device watchdog connection reset peg counter, device watchdog peg counter-based peer selector may set the device watchdog connection reset peg counter to zero at the beginning of each sampling/maintenance time interval. Each time a peer connection is dropped due to a device watchdog timeout, device watchdog peg counter-based peer selector 504 may increment the device watchdog connection reset peg counter.

In order to maintain the device watchdog message peg counter, at the beginning of a sampling/maintenance time interval, device watchdog peg counter-based peer selector 504 may initialize the device watchdog message peg counter to zero. Each time a Diameter node sends a device watchdog request message to an adjacent peer and a corresponding device watchdog answer is received, device watchdog peg counter-based peer selector 504 may increment the device watchdog message peg.

In order to maintain the device watchdog timer reset peg counter, device watchdog peg counter-based peer selector 504 may set the peg counter to zero at the beginning of a sampling/maintenance timer interval. Each time the IETF RFC 3539 device watchdog timer resets for a peer, the device watchdog peg counter-based peer selector 504 increments the device watchdog timer reset peg counter to count the number of device watchdog timer resets for the peer.

During a sampling/maintenance time interval, device watchdog peg counter-based peer selector 504 may sample, for each peer identified as a candidate to which a received Diameter request message could be routed, values of the device watchdog connection reset peg counter, the device watchdog message peg counter, and the device watchdog timer reset peg counter. Device watchdog peg counter-based peer selector 504 may utilize the values of the device watchdog peg counters to select a set of one or more candidate Diameter peers using the algorithm set forth in FIG. 2. If more than one candidate Diameter peer remains after performing the selection, device watchdog peg counter-based peer selector 504 may store the peers in the set use the set during the same sampling time interval to route subsequent messages addressed to the same application identifier and destination realm as a received Diameter request message.

Diameter peer 100 further includes a Diameter routing engine 508 for routing messages based on results of the selection. For example, if the result of the selection is a single Diameter peer, then Diameter routing engine 508 routes the message to that Diameter peer. If the result of the selection is multiple candidate Diameter peers, Diameter routing engine 508 selects one of the candidate Diameter peers using a selection algorithm, such as round robin selection, routes the received Diameter request message to the selected Diameter peer. Diameter routing engine 508 may continue to use the same stored set of Diameter peers to route messages addressed to the same destination realm and application as the received Diameter messages until the device watchdog peg counter sampling/maintenance time interval ends.

Although Diameter node 100 is described herein as maintaining and utilizing three device watchdog peg counters to select Diameter peers for realm-based routing, the subject matter described herein is not limited to using these three peg counters. Using one of these peg counters individually or in combination with these and/or other peg counters or information about the relative availability of Diameter peers is intended to be within the scope of the subject matter described herein.

Maintaining device watchdog peg counters for Diameter peers and using the device watchdog peg counters to select among candidate peers for ream-based routing solves a problem existing exclusively in the realm of computer networks—i.e., how to efficiently distributed Diameter request messages among Diameter peers. In addition, maintaining and using device watch dog peg counters for realm-based routing improves the performance of computers and computer networks. For example, using a peer selection algorithm that attempts to route each message to the most available peer increases the likelihood that the processing load among peers will be balanced, decreases the likelihood that message processing will fail for a given message, and increases the message throughput in the network.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for realm-based routing of Diameter request messages, the method comprising:
   maintaining device watchdog peg counters for Diameter peers;
   receiving a Diameter request message for which realm-based routing is indicated;
   using at least a destination realm to identify a plurality of candidate Diameter peers to which the Diameter request message could be routed;
   sampling the device watchdog peg counters for the candidate Diameter peers;
   selecting at least one of the candidate Diameter peers to which the Diameter request message could be routed using the device watchdog peg counters; and
   routing the Diameter request message to one of the candidate Diameter peers based on results of the selecting;
   wherein selecting at least one of the candidate Diameter peers to which the Diameter request message could be routed using device watchdog peg counters includes selecting a first subset of the candidate Diameter peers based on relative values of device watchdog connection reset peg counters maintained for the candidate Diameter peers;
   wherein selecting the first subset of the candidate Diameter peers comprises including, in the first subset, candidate Diameter peers with a lowest value of the device watchdog connection reset peg counter and excluding, from the first subset, candidate Diameter peers with values of the device watchdog connection reset peg counter higher than the lowest value.

2. The method of claim 1 wherein maintaining device watchdog peg counters for the Diameter peers includes maintaining, for each of the Diameter peers, a device watchdog connection reset peg counter indicating a number of times that a connection with the Diameter peer has been reset due to expiration of a device watchdog timer.

3. The method of claim 1 wherein maintaining device watchdog peg counters for the Diameter peers includes maintaining, for each of the Diameter peers, a device watchdog message peg counter that counts a number of successful device watchdog message exchanges with the Diameter peer.

4. The method of claim 1 wherein maintaining device watchdog peg counters for the Diameter peers includes maintaining, for each of the Diameter peers, a device watchdog timer reset peg counter that counts a number of times a device watchdog timer has been reset for the Diameter peer.

5. The method of claim 1 wherein selecting at least one of the candidate Diameter peers includes selecting, from the first subset, a second subset of the candidate Diameter peers based on relative values of device watchdog message peg counters maintained for the connections.

6. The method of claim 5 wherein selecting the second subset comprises including, in the second subset, candidate Diameter peers with a highest value of the device watchdog message peg counter and excluding from the second subset, candidate Diameter peers with values of the device watchdog message peg counter lower than the highest value of the device watchdog message peg counter.

7. The method of claim 6 wherein selecting at least one of the candidate Diameter peers includes selecting, from the second subset, a third subset of candidate Diameter peers based on relative values of a device watchdog timer reset peg counter maintained for the candidate Diameter peers.

8. The method of claim 7 wherein selecting the third subset comprises including, in the third subset, candidate Diameter peers with a lowest value of the device watchdog timer reset peg counter and excluding from the third subset, candidate Diameter peers with values of the device watchdog timer reset peg counter higher than the lowest value of the device watchdog timer reset peg counter.

9. A system for realm-based routing of Diameter request messages, the system comprising:
   a Diameter node including at least one processor and a memory for receiving a Diameter request message for which realm-based routing is indicated;
   the Diameter node including a device watchdog peg counter-based peer selector for maintaining a plurality of device watchdog peg counters for Diameter peers, using at least a destination realm to identify a plurality of candidate Diameter peers to which the Diameter request message could be routed, sampling the device watchdog peg counters for the candidate Diameter peers, selecting at least one of the candidate Diameter peers to which the Diameter request message could be routed using the device watchdog peg counters; and the Diameter node including a routing engine for routing the Diameter request message to one of the candidate Diameter peers based on results of the selecting;
   wherein the device watchdog peg counter-based peer selector is configured to select a first subset of the candidate Diameter peers based on relative values of device watchdog connection reset peg counters maintained for the candidate Diameter peers;
   wherein the device watchdog peg counter-based peer selector is configured to select the first subset of the candidate Diameter peers by including, in the first subset, candidate Diameter peers with a lowest value of the device watchdog connection reset peg counter and exclude, from the first subset, candidate Diameter peers with values of the device watchdog connection reset peg counter higher than the lowest value.

10. The system of claim 9 wherein the device watchdog peg counter-based peer selector is configured to maintain, for each of the candidate Diameter peers, a device watchdog connection reset peg counter indicating a number of times that a connection with a candidate Diameter peer has been reset due to expiration of a device watchdog timer.

11. The system of claim 9 wherein the device watchdog peg counter-based peer selector is configured to maintain, for each of the Diameter peers, a device watchdog message peg counter that counts a number of successful device watchdog message exchanges with the Diameter peer.

12. The system of claim 9 wherein the device watchdog peg counter-based peer selector is configured to maintain, for each of the Diameter peers, a device watchdog timer reset peg counter that counts a number of times a device watchdog timer has been reset for the Diameter peer.

13. The system of claim 9 wherein the device watchdog peg counter-based peer selector is configured to select, from the first subset, a second subset of the candidate Diameter peers based on relative values of device watchdog message peg counters maintained for the connections.

14. The system of claim 13 wherein the device watchdog peg counter-based peer selector is configured to include, in the second subset, candidate Diameter peers with a highest value of the device watchdog message peg counter and exclude from the second subset, candidate Diameter peers with values of the device watchdog message peg counter lower than the highest value of the device watchdog message peg counter.

15. The system of claim 14 wherein the device watchdog peg counter-based peer selector is configured to select, from the second subset, a third subset of candidate Diameter peers based on relative values of a device watchdog timer reset peg counter maintained for the candidate Diameter peers.

16. The system of claim 15 wherein the device watchdog peg counter-based peer selector is configured to include, in the third subset, candidate Diameter peers with a lowest value of the device watchdog timer reset peg counter and exclude, from the third subset, candidate Diameter peers with values of the device watchdog timer reset peg counter higher than the lowest value of the device watchdog timer reset peg counter.

17. A non-transitory computer readable medium having stored thereon executable instructions that when executed by a processor of a computer control the computer to perform steps comprising:
  maintaining device watchdog peg counters for Diameter peers;
  receiving a Diameter request message for which realm-based routing is indicated;
  using at least a destination realm to identify a plurality of candidate Diameter peers to which the Diameter request message could be routed;
  sampling the device watchdog peg counters for the candidate Diameter peers;
  selecting at least one of the candidate Diameter peers to which the Diameter request message could be routed using the device watchdog peg counters; and
  routing the Diameter request message to one of the candidate Diameter peers based on results of the selecting;
  wherein selecting at least one of the candidate Diameter peers to which the Diameter request message could be routed using device watchdog peg counters includes selecting a first subset of the candidate Diameter peers based on relative values of device watchdog connection reset peg counters maintained for the candidate Diameter peers;
  wherein selecting the first subset of the candidate Diameter peers comprises including, in the first subset, candidate Diameter peers with a lowest value of the device watchdog connection reset peg counter and excluding, from the first subset, candidate Diameter peers with values of the device watchdog connection reset peg counter higher than the lowest value.

* * * * *